United States Patent
Kanzaki

(10) Patent No.: US 11,708,448 B2
(45) Date of Patent: Jul. 25, 2023

(54) WATER BLOCKING MATERIAL

(71) Applicant: Archem Inc., Tokyo (JP)

(72) Inventor: Shinya Kanzaki, Tokyo (JP)

(73) Assignee: Archem Inc., Tokyo (JP)

( * ) Notice: Subject to any disclaimer, the term of this patent is extended or adjusted under 35 U.S.C. 154(b) by 290 days.

(21) Appl. No.: 16/754,607

(22) PCT Filed: Oct. 10, 2018

(86) PCT No.: PCT/JP2018/037683
§ 371 (c)(1),
(2) Date: Apr. 8, 2020

(87) PCT Pub. No.: WO2019/073997
PCT Pub. Date: Apr. 18, 2019

(65) Prior Publication Data
US 2020/0283564 A1  Sep. 10, 2020

(30) Foreign Application Priority Data
Oct. 11, 2017 (JP) .................................. 2017-197938

(51) Int. Cl.
| | |
|---|---|
| *C08G 18/76* | (2006.01) |
| *C08G 18/08* | (2006.01) |
| *C08G 18/18* | (2006.01) |
| *C08J 9/00* | (2006.01) |
| *C09K 3/10* | (2006.01) |

(52) U.S. Cl.
CPC ..... *C08G 18/7671* (2013.01); *C08G 18/0842* (2013.01); *C08G 18/1833* (2013.01); *C08G 18/7621* (2013.01); *C08J 9/0061* (2013.01); *C09K 3/10* (2013.01); *C08G 2110/005* (2021.01); *C08G 2190/00* (2013.01); *C08J 2375/04* (2013.01); *C08J 2483/04* (2013.01); *C09K 2003/1081* (2013.01)

(58) Field of Classification Search
CPC .... C08G 18/00; C08G 18/0842; C08G 18/16; C08G 18/1833; C08G 18/42; C08G 18/66; C08G 18/76; C08G 18/7621; C08G 18/7671; C08G 2110/005; C08G 2190/00; C08J 9/0061; C08J 2375/04; C08J 2483/04; C08K 3/10; C08K 3/1021; C08K 2003/1081
See application file for complete search history.

(56) References Cited

U.S. PATENT DOCUMENTS

| | | | | |
|---|---|---|---|---|
| 2004/0122118 A1* | 6/2004 | Tanaka | ................... | C08G 18/61 521/50 |
| 2004/0192797 A1* | 9/2004 | Xia | ..................... | C08G 18/4833 521/155 |
| 2006/0213608 A1* | 9/2006 | Moineau | ............. | C08G 18/4233 521/155 |
| 2010/0028650 A1* | 2/2010 | Kusakawa | .............. | C08G 18/10 428/221 |
| 2015/0259465 A1* | 9/2015 | Burckhardt | ........... | C04B 40/065 524/839 |

FOREIGN PATENT DOCUMENTS

| | | |
|---|---|---|
| JP | 2002-226829 A | 8/2002 |
| JP | 2005-060502 A | 3/2005 |
| JP | 2007-500772 A | 1/2007 |
| JP | 2009-173806 A | 8/2009 |
| JP | 2010-202754 A | 9/2010 |
| JP | 2013-029592 A | 2/2013 |
| JP | 2015-199965 A | 11/2015 |
| WO | 2012086776 A1 | 6/2012 |

OTHER PUBLICATIONS

Extended European Search Reported dated Jun. 17, 2021 by the European Patent Office in application No. 18866224.1.
International Search Report for PCT/JP2018/037683 dated Nov. 13, 2018 [PCT/ISA/210].
Written Opinion for PCT/JP2018/037683 dated Nov. 13, 2018 [PCT/ISA/237].
Nov. 2, 2022, search result of Office Action issued by the China National Intellectual Property Administration in the corresponding Chinese Patent Application No. 201880065460.9.

* cited by examiner

*Primary Examiner* — John M Cooney
(74) *Attorney, Agent, or Firm* — Kenja IP Law PC

(57) ABSTRACT

Provided is a water blocking material prepared by reacting and foaming a starting material composition that contains a polyol, a polyisocyanate, a catalyst, a foaming agent, a foam stabilizer and a crosslinking agent, in which the polyol contains a dimer acid polyol, the content of the dimer acid polyol in the starting material composition is 85% by mass or more of the entire polyol, the polyisocyanate contains a diphenylmethane diisocyanate, the content of the diphenylmethane diisocyanate in the starting material composition is 70 to 85% by mass of the entire polyisocyanate, and the foam stabilizer contains a reactive silicone. The water blocking material is excellent in heat resistance and water blocking performance and is further excellent in flexibility.

20 Claims, 1 Drawing Sheet

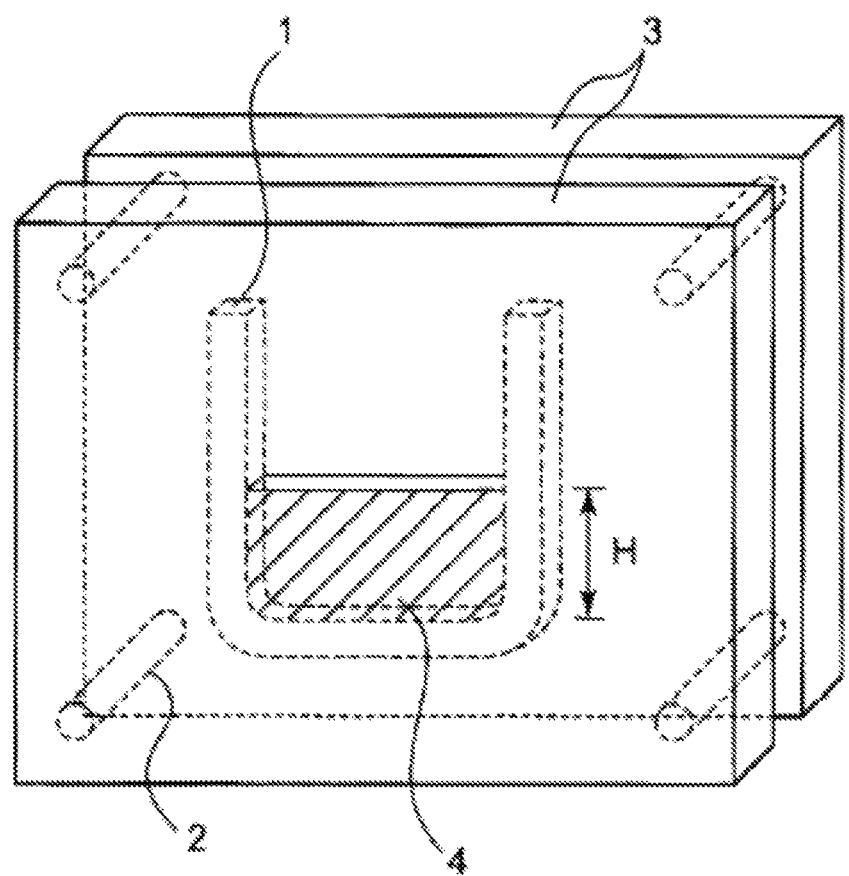

WATER BLOCKING MATERIAL

CROSS REFERENCE TO RELATED APPLICATIONS

This application is a National Stage of International Application No. PCT/JP2018/037683 filed Oct. 10, 2018, claiming priority based on Japanese Patent Application No. 2017-197938 filed Oct. 11, 2017.

TECHNICAL FIELD

The present invention relates to a water blocking material.

BACKGROUND ART

Heretofore, a rubber foam and a polyurethane foam are positioned as typical water blocking materials, and among them, in particular, a polyurethane foam has flexible mechanical properties and is excellent in processability, and using a highly water-repellent material as a urethane starting material, a polyurethane foam has heretofore been used as a water blocking sealing material.

Such a sealing material is utilized in a broad field of automobiles, housings, constructions, civil engineering, etc.

PTL 1 describes a thin, open-cell low-density polyurethane foam sealing material that uses a polyether-based polyol having an ethylene oxide addition molar ratio of less than 10 mol % as a polyol, a tolylene diisocyanate alone or combined with an MDI-based isocyanate in a ratio of less than 10 mol % as an isocyanate compound, an organosilicone compound having two reactive hydroxy groups in the side chain and having a siloxane content of 20 to 30% as a foam stabilizer, and water as a foaming agent.

1: JP 2005-60502A

SUMMARY OF INVENTION

Technical Problem

The low-density polyurethane foam sealing material described in PTL 1 is insufficient in heat resistance.

A technical problem of the present invention is to provide a water blocking material which is excellent in heat resistance and water blocking performance and further excellent in flexibility.

Solution to Problem

As a result of assiduous studies, the present inventor has found that a water blocking material prepared by reacting and foaming a starting material composition that contains a polyol, a polyisocyanate, a catalyst, a foaming agent, a foam stabilizer and a crosslinking agent can solve the above-mentioned problem when the polyol therein contains a specific amount of a dimer acid polyol, the polyisocyanate contains a specific amount of a diphenylmethane diisocyanate, and the foam stabilizer contains a reactive silicone. The present invention has been completed on the basis of such findings.

Specifically, the present invention relates to the following <1> to <9>.

<1> A water blocking material prepared by reacting and foaming a starting material composition that contains a polyol, a polyisocyanate, a catalyst, a foaming agent, a foam stabilizer and a crosslinking agent, in which the polyol contains a dimer acid polyol, the content of the dimer acid polyol in the starting material composition is 85% by mass or more of the entire polyol, the polyisocyanate contains a diphenylmethane diisocyanate, the content of the diphenylmethane diisocyanate in the starting material composition is 70 to 85% by mass of the entire polyisocyanate, and the foam stabilizer contains a reactive silicone.

<2> The water blocking material according to <1>, wherein the foaming agent contains water, and the content of water in the starting material composition is 2.4 to 3.2 parts by mass relative to 100 parts by mass of the polyol.

<3> The water blocking material according to <1> or <2>, wherein the polyisocyanate further contains a tolylene diisocyanate.

<4> The water blocking material according to any one of <1> to <3>, wherein the catalyst does not contain an organic metal catalyst or the content of an organic metal catalyst in the starting material composition is less than 0.2 parts by mass relative to 100 parts by mass of the polyol.

<5> The water blocking material according to any one of <1> to <4>, wherein the content of the crosslinking agent in the starting material composition is 1.5 to 3 parts by mass relative to 100 parts by mass of the polyol.

<6> The water blocking material according to any one of <1> to <5>, wherein the crosslinking agent is a trifunctional crosslinking agent having a trimethylolpropane skeleton.

<7> The water blocking material according to any one of <1> to <6>, wherein the content of the foam stabilizer in the starting material composition is 3.0 to 6.0 parts by mass relative to 100 parts by mass of the polyol.

<8> The water blocking material according to any one of <1> to <7>, having a density of 30 to 50 kg/m$^3$.

<9> The water blocking material according to any one of <1> to <8>, wherein the number of cells that the water blocking material has is 60 cells/25 mm or more.

Advantageous Effects of Invention

According to the present invention, there can be provided a water blocking material which is excellent in heat resistance and water blocking performance and further excellent in flexibility.

BRIEF DESCRIPTION OF DRAWING

FIG. 1 is a schematic view showing a state of water blocking performance evaluation.

DESCRIPTION OF EMBODIMENTS

Hereinunder the present invention is described in detail.

In the present invention, an expression of "A to B" indicating a numerical value definition means a numerical value range including the end points A and B, and means A or more and B or less (A<B), or A or less and B or more (A>B).

Part by mass and % by mass each are the same as part by weight and % by weight, respectively.

In the present invention, a combination of preferred embodiments is a more preferred embodiment.

(Water Blocking Material)

The water blocking material of the present invention is prepared by reacting and foaming a starting material composition that contains a polyol, a polyisocyanate, a catalyst, a foaming agent, a foam stabilizer and a crosslinking agent, in which the polyol contains a dimer acid polyol, the content of the dimer acid polyol in the starting material composition is 85% by mass or more of the entire polyol, the polyisocyanate contains a diphenylmethane diisocyanate, the content of the diphenylmethane diisocyanate in the starting material composition is 70 to 85% by mass of the entire polyisocyanate, and the foam stabilizer contains a reactive silicone.

The water blocking material of the present invention is a water blocking material of a polyurethane foam prepared by reacting and foaming the starting material composition.

The polyurethane foam sealing material described in PTL 1 has a heat resistance level of 80° C. or so and is therefore problematic in that it is unsuitable, for example, as a part around engines for automobiles from the viewpoint of the heat resistance level thereof. In addition, when the heat resistance of the urethane foam is tried to be improved, the urethane itself becomes rigid and its flexibility is low and tear strength is low, and therefore the urethane foam may readily tear owing to deformation, that is, it is difficult to satisfy both heat resistance and flexibility of the urethane foam.

On the other hand, a rubber foam is excellent in flexibility but shrinks too much under heat-resistant conditions and is therefore unsuitable as a water blocking material such that the interfacial adhesiveness thereof has a significant influence on the water blocking performance of the material. In addition, a rubber foam is highly hard, and is therefore unsuitable as a part to be assembled in automobiles.

The present invention can provide a water blocking material which is excellent in heat resistance and water blocking performance and is further excellent in flexibility, and the water blocking material can be used especially favorably in the case where both heat resistance and water blocking performance are desired, for example, for a water blocking material around engines for automobiles.

Though not clear, the mechanism of expression of the effect is presumed to be as follows. As a polyol, when a hydrophobic dimer acid polyol is contained in an amount of 85% by mass or more of the entire polyol, the water blocking material can be presumed to be given water repellency. On the other hand, as a polyisocyanate, when a diphenylmethane diisocyanate is contained in an amount of 70% by mass or more of the entire polyisocyanate, the water blocking material can be presumed to be excellent in heat resistance. Further, when the content of the diphenylmethane diisocyanate is 85% by mass or less of the entire polyisocyanate, the water blocking material can be presumed to be excellent in flexibility.

<Starting Material Composition>

The water blocking material of the present invention is prepared by reacting and foaming the starting material composition, and the starting material composition contains a polyol, a polyisocyanate, a catalyst, a foaming agent, a foam stabilizer and a crosslinking agent.

The starting material composition for producing the water blocking material of the present invention is described below.

[Polyol]

In the present invention, the starting material composition contains a polyol, and the polyol contains a dimer acid polyol. The dimer acid polyol is described below.

In the present invention, "polyol" means a compound having at least 2 hydroxy groups and having a number-average molecular weight of 1,000 or more, and does not contain a low-molecular-weight polyalcohol (having a low molecular weight of less than 1,000). "Polyol" in the present invention excludes a compound that has a siloxane bond-having main skeleton, in which, preferably, the main chain is formed of carbons and hydrogens alone.

—Dimer Acid Polyol—

In the present invention, the polyol in the starting material composition contains a dimer acid polyol. Here, a dimer acid is a dibasic acid, which is prepared through bimolecular bonding (dimerization) via carbon-carbon covalent bond of two monobasic acids each having an ethylenically-unsaturated bond, such as a monoenoic acid, a dienoic acid or a trienoic acid.

A production method for the dimer acid is not specifically limited, for which a monoenoic acid, a dienoic acid or a trienoic acid may be catalytically heated as it is or in the form of a methyl ester thereof to cause polymerization accompanied with dehydrogenation and conjugation to thereby give a dimer acid. The dimer acid includes an acyclic form, a monocyclic form, a polycyclic form and an aromatic form, but is preferably a monocyclic form.

A typical example of the dimer acid is a compound represented by the following structural formula, as prepared by heating linolic acid and oleic acid.

[Chem. 1]

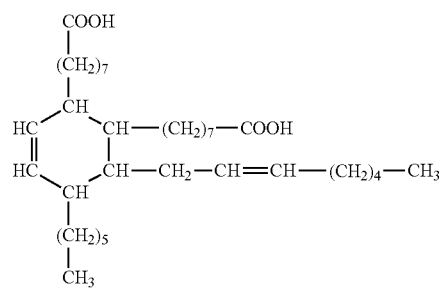

The dimer acid polyol is an esterification reaction product of the above-mentioned dimer acid and a polyol, and includes, though not limited thereto, a dimer acid polyester polyol that is a reaction product of a dimer acid and a short-chain diol, triol, or tetrafunctional or higher polyol; a reaction product of a dimer acid and a polyalkylene glycol, a polyalkylene triol or a long-chain polyol; a reaction product prepared by reacting a mixture of a dimer acid and any other polycarboxylic acid (for example, adipic acid) and any of the above-mentioned various types of polyols; a reaction product of a dimer acid and an alkylene oxide; or a mixture thereof.

The number-average-molecular weight of the dimer acid polyol is preferably 1,000 to 10,000, more preferably 1,500 to 5,000, even more preferably 2,000 to 4,000. When the number-average molecular weight thereof falls within the above-mentioned range, the dimer acid polyol secures more stable foamability and can readily make the resultant urethane foam have intended properties.

In the present invention, the number-average molecular weight and the weight-average molecular weight are measured through GPC (gel permeation chromatography) as standard polystyrene-equivalent values.

The hydroxyl value of the dimer acid polyol is preferably 11.2 to 180 mgKOH/g, more preferably 30 to 150 mgKOH/g, even more preferably 60 to 100 mgKOH/g. When the hydroxyl value thereof falls within the above-mentioned range, the dimer acid polyol can be blended in a well-balanced manner with the other constituent components of the starting material composition, and can provide more stable foamability.

The hydroxyl value of the dimer acid polyol is measured according to JIS K 1557-1:2007.

One alone or two or more kinds of dimer acid polyols may be used either singly or as combined.

In the present invention, the content of the dimer acid polyol is 85% by mass or more of the entire polyol. When the content of the dimer acid polyol is less than 85% by mass, sufficient heat resistance and water blocking performance cannot be secured.

The upper limit of the content of the dimer acid polyol is not specifically limited, and the entire polyol may be a dimer acid polyol.

Preferably, the content of the dimer acid polyol is 90 to 100% by mass of the entire polyol, more preferably 95 to 100% by mass, even more preferably 98 to 100% by mass, and especially preferably, the total amount of the polyol is a dimer acid polyol.

—Other Polyols—

In the present invention, the starting material composition may contain any other polyol than the dimer acid polyol.

With no specific limitation, the other polyol may be any compound except a dimer acid polyol having 2 or more hydroxy groups in one molecule, and examples thereof include a polyester polyol, a polyether polyol, and a polymer polyol. One alone or two or more kinds of such polyols may be used either singly or as combined.

Examples of the polyester polyol include polyester polyols having, as an acid component, an aliphatic dicarboxylic acid having 4 to 20 carbon atoms such as adipic acid, suberic acid, sebacic acid or brassylic acid, or a terephthalic acid or an isophthalic acid, and having, as a polyol component (alcohol component), an aliphatic diol having 1 to 6 carbon atoms such as ethylene glycol, or an ether glycol such as diethylene glycol or dipropylene glycol.

Though not specifically limited thereto, the polyether polyol is preferably a polyether polyol to be prepared through ring-opening polymerization of an alkylene oxide from the viewpoint of reactivity. Such alkylene oxides include propylene oxide (PO) and ethylene oxide (EO), and one alone or two or more kinds thereof may be used either singly or as combined.

As the polyether polyol, a homopolymer of PO, a homopolymer of EO and polyether polyols prepared through copolymerization of PO and EO can also be used.

[Polyisocyanate]

In the present invention, the starting material composition contains a polyisocyanate. With no specific limitation, the polyisocyanate may be any compound having 2 or more isocyanato (also referred to as isocyanate) groups in one molecule.

Specifically, examples of the compound include tolylene diisocyanate (TDI), 4,4'-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, and isophorone diisocyanate (IPDI).

In the starting material composition, the polyisocyanate contains a diphenylmethane diisocyanate in an amount of 70 to 85% by mass of the entire polyisocyanate. When the content of the diphenylmethane diisocyanate is less than 70% by mass, fine cells could hardly be formed and sufficient heat resistance could not be secured. On the other hand, when the content is more than 85% by mass, flexibility intrinsic to urethane foams may lower to worsen followability to deformation thereby often leading to a phenomenon of urethane foam tearing.

Not specifically limited thereto, the diphenylmethane diisocyanate may be any of 2,2'-diphenylmethane diisocyanate, 2,4'-diphenylmethane diisocyanate or 4,4'-diphenylmethane diisocyanate, and may also be a mixture thereof. In addition, it may also be a polymeric diphenylmethane diisocyanate (polymeric MDI, polymethylene polyphenyl polyisocyanate).

In the present invention, the starting material composition preferably contains a tolylene diisocyanate in addition to the above-mentioned diphenylmethane diisocyanate, as a polyisocyanate.

The tolylene diisocyanate is preferably 2,4-tolylene diisocyanate, 2,6-tolylene diisocyanate, or a mixture thereof.

Preferably, the content of the tolylene diisocyanate is 15 to 30% by mass of the entire polyisocyanate.

Specifically, in the present invention, as a polyisocyanate, a diphenylmethane diisocyanate and a tolylene diisocyanate are used together, and especially preferably, the polyisocyanate is composed of a diphenylmethane diisocyanate and a tolylene diisocyanate alone.

The isocyanate index of the polyisocyanate may be 100 or less, or may also be more than 100, but is preferably 80 to 120, more preferably 95 to 115. When the isocyanate index is 80 or more, the resultant foam may have a suitable hardness and may be excellent in mechanical properties such as compressive residual strain. On the other hand, when the index is 120 or less, such is preferred since heat generation in producing foams can be suppressed and therefore the resultant foams can be prevented from being colored.

Here, the isocyanate index is an equivalent ratio, expressed as percentage, of the isocyanate group of the polyisocyanate relative to the active hydrogen group that the polyol or water as a foaming agent has. Accordingly, the isocyanate index of more than 100 means that the polyisocyanate is more excessive than the polyol, etc.

[Catalyst]

The starting material composition in the present invention contains a catalyst. The catalyst is one for promoting urethanation reaction between the polyol and the polyisocyanate and foaming reaction between water as a foaming agent and the polyisocyanate, and may be appropriately selected from conventionally-known compounds.

Specifically, the catalyst includes tertiary amines such as triethylenediamine, dimethylethanolamine and N,N',N'-trimethylaminoethylpiperazine; organic metal compounds (organic metal catalysts) such as tin octylate, (tin octoate) and dibutyltin dilaurate; acetates; and alkali metal alcoholates.

In the present invention, preferably, the starting material composition does not contain an organic metal catalyst as the catalyst, or the content of an organic metal catalyst therein is less than 0.2 parts by mass relative to 100 parts by mass of the polyol (hereinafter "the starting material composition does not contain an organic metal catalyst, or the content of an organic metal catalyst therein is less than 0.2 parts by mass relative to 100 parts by mass of the polyol" may be referred to as "the starting material composition contains an organic metal catalyst in an amount of 0 part by mass or more and less than 0.2 parts by mass relative to 100 parts by mass of the polyol"). When the content of an organic metal catalyst is 0 part by mass or more and less than 0.2 parts by mass relative to 100 parts by mass of the polyol, the starting material composition has stable foamability and can give a water blocking material having a desired number of cells.

In the present invention, the content of an organic metal catalyst is more preferably 0 to 0.15 parts by mass relative to 100 parts by mass of the polyol, even more preferably 0 to 0.05 parts by mass, further more preferably 0 to 0.01 parts by mass, and especially preferably 0 part by mass, that is, the starting material composition does not contain an organic metal catalyst.

Preferably, in the present invention, the starting material composition contains an amine catalyst as the catalyst. One kind alone or two or more kinds of amine catalysts may be used either singly or as combined.

The amine catalyst is roughly classified into a reactive amine catalyst having a functional group reactive with an isocyanate group, and a nonreactive amine catalyst not having a functional group reactive therewith.

The reactive amine catalyst is preferably an amine compound having at least one hydroxy group, and examples thereof include N,N-dimethylaminoethoxyethanol, N,N-dimethylaminohexanol, monoethanolamine, diethanolamine, triethanolamine, dimethylaminoethanol, N,N,N'-trimethylaminoethylethanolamine, N-methyl-N'-(2-hydroxyethyl)-piperazine, bis(2-dimethylaminoethyl) ether, and N-(2-hydroxyethyl)morpholine.

The nonreactive amine catalyst includes triethylamine, tripropylamine, tributylamine, hexadecyldimethylamine, N-methylmorpholine, N-ethylmorpholine, N-octadecylmorpholine, diethyltriamine, N,N,N',N'-tetramethylhexanediamine, N,N,N',N'-tetramethylpropanediamine, N,N,N',N'',N''-pentamethyldiethylenetriamine, N,N',N'-trimethylaminoethylpiperazine, N,N-dimethylcyclohexylamine, N,N,N',N'-tetramethylethylenediamine, and triethylenediamine.

In the present invention, preferably, the starting material composition contains a nonreactive amine catalyst as the amine catalyst, and also preferably, the content of a reactive amine catalyst therein is 0 to 50% by mass of the content of a nonreactive amine catalyst, more preferably 0 to 30% by mass, even more preferably 0 to 10% by mass, and especially preferably, the starting material composition does not contain a reactive amine catalyst. When the content of a reactive amine catalyst falls within the above-mentioned range, foaming can be readily controlled to form a desired number of cells.

The content of the catalyst is preferably 0.1 to 3.0 parts by mass relative to 100 parts by mass of the polyol, more preferably 0.3 to 2.0 parts by mass, even more preferably 0.5 to 1.5 parts by mass.

When the amine catalyst content falls within the above-mentioned range, urethanation reaction and foaming reaction can be promoted sufficiently and in a well-balanced manner.

[Foaming Agent]

The starting material composition in the present invention contains a foaming agent. The foaming agent is one for foaming a polyurethane resin to give a polyurethane foam.

In the present invention, preferably, water is contained as the foaming agent, and also preferably, the water content is 2.0 to 3.2 parts by mass relative to 100 parts by mass of the polyol. More preferably, the water content is 2.0 to 2.8 parts by mass relative to 100 parts by mass of the polyol, even more preferably 2.4 to 2.8 parts by mass. When the water content falls within the above-mentioned range, foaming occurs appropriately by foaming reaction to give a water blocking material having a low density. In addition, the reaction heat can be controlled to fall within an appropriate range to prevent scorching of the inside part of the resultant foam.

The starting material composition in the present invention may contain any other foaming agent than water, but preferably contains water alone as the foaming agent. Other foaming agents than water include liquefied nitrogen and liquefied carbon dioxide; halogenoalkanes such as monofluorotrichloromethane and dichloromethane; low-boiling-point alkanes such as butane and pentane; and azobisisobutyronitrile that generates decomposed nitrogen gas.

[Foam Stabilizer]

The starting material composition in the present invention contains a foam stabilizer. The foam stabilizer is used, if desired, for smoothly promoting foaming by a foaming agent. As such a foam stabilizer, any one generally used in producing soft polyurethane foams can be used. Specifically, the foam stabilizer for use herein includes a silicone compound, an anionic surfactant such as sodium dodecylbenzenesulfonate and sodium laurylsulfate, a polyether siloxane, and a phenolic compound.

The content of the foam stabilizer in the starting material composition is preferably 0.5 to 10.0 parts by mass relative to 100 parts by mass of the polyol. When the content is 0.5 parts by mass or more, foam stabilization action can be expressed sufficiently during foaming to give good foams. On the other hand, when the content is 10.0 parts by mass or less, foam stabilization action can be appropriate to keep open-cell condition in a suitable range. More preferably, the content of the foam stabilizer is 1.5 to 8.0 parts by mass relative to 100 parts by mass of the polyol, even more preferably 3.0 to 6.0 parts by mass.

In the present invention, the starting material composition contains a reactive silicone as the foam stabilizer. Containing a reactive silicone, the composition secures excellent foaming performance and water blocking performance. Here, the reactive silicone is a silicone compound (polysiloxane compound) having at least one reactive group selected from an amino group, an epoxy group, a hydroxy group, a mercapto group and a carboxy group at the terminal of the main chain or in the side chain of the compound.

The reactive silicone is one prepared by introducing a reactive group selected from an amino group, an epoxy group, a hydroxy group, a mercapto group and a carboxy group or a group having such a reactive group into the terminal of a main chain or into the side chain of a silicone compound such as dimethylsilicone, methylphenylsilicone or methylhydrogensilicone. Among these, a reactive silicone having a hydroxy group as the reactive group is preferred. A reactive silicone having a hydroxy group as the reactive group has a main skeleton with a siloxane bond, and as described above, this does not corresponds to the polyol in the present invention.

As the reactive silicone, commercially-available products may be used, and examples thereof include various reactive silicones available from Shin-Etsu Silicones Co., Ltd., DuPont Toray Specialty Materials K.K., Momentive Performance Materials Inc., etc. Specifically, examples of a reactive silicone having a hydroxy group include X-22-4039, and X-22-4015 (both by Shin-Etsu Silicones Co., Ltd.). Examples of a reactive silicone having a carboxy group include CF1218 (by DuPont Toray Specialty Materials K.K., reactive carboxy-modified organosilicone).

In the present invention, the starting material composition may contain a nonreactive silicone in addition to the above-mentioned reactive silicone. The nonreactive silicone is not specifically limited so far as it does not have a reactive group, and may be a modified nonreactive silicone such as a polyether-modified, aralkyl-modified or long-chain alkyl-modified one. As the nonreactive silicone, commercially-available products may be used, and various products available from Shin-Etsu Silicones Co., Ltd., DuPont Toray Specialty Materials K.K., Momentive Performance Materials Inc. and others can be appropriately selected and used here.

In the present invention, preferably, the starting material composition contains a reactive silicone in an amount of 50% by mass or more of the total amount of the foam stabilizer therein, more preferably 75% by mass or more, even more preferably 90% by mass or more, and especially preferably, the total amount of the foam stabilizer is a reactive silicone.

[Crosslinking Agent]

In the present invention, the starting material composition contains a crosslinking agent. The crosslinking agent includes a low-molecular compound having, in one molecule, 2 or more active hydrogen-containing groups reactive with an isocyanate group. Above all, preferred is a low-molecular compound (having a molecular weight of less than 1,000) having 2 or more hydroxy groups in one molecule. In the present invention, the crosslinking agent excludes a compound having an amino group as an active hydrogen-containing group.

Specific examples of the crosslinking agent includes a polyhydric alcohol such as ethylene glycol, diethylene glycol, propylene glycol, dipropylene glycol, 1,4-butanediol, 1,6-hexanediol, neopentyl glycol, glycerin, trimethylolpropane, triethanolamine, and bisphenol A alkylene oxide adduct.

In the present invention, preferably, the starting material composition contains a trifunctional crosslinking agent having a trimethylolpropane skeleton as the crosslinking agent. Using a trifunctional crosslinking agent having a trimethylolpropane skeleton, a water blocking agent excellent in water blocking performance and heat resistance can be obtained.

Examples of the functional group that the trifunctional crosslinking agent having a trimethylolpropane skeleton has includes a hydroxy group, an amino group, a cyano group, an epoxy group, a carboxy group and a formyl group. Among these, a hydroxy group is preferred.

As the trifunctional crosslinking agent having a trimethylolpropane skeleton, commercially-available products such as "Actocol (registered trademark) T880" (by Mitsui Chemicals Inc.) can be used.

The content of the crosslinking agent in the starting material composition is preferably 0.5 to 10 parts by mass relative to 100 parts by mass of the polyol, more preferably 1.0 to 5.0 parts by mass, even more preferably 1.5 to 3.0 parts by mass. By incorporating the crosslinking agent therein, it is presumed that the crosslinking density of the resultant polyurethane foam can increase to further enhance the water blocking performance and the heat resistance thereof.

[Other Starting Material Components]

If desired, the starting material composition may further contain a flame retardant, a filler, a stabilizer, a colorant, a plasticizer and the like according to ordinary methods. The flame retardant includes tris-dichloropropyl phosphate, tris-chloroethyl phosphate, dibromoneopentyl alcohol, and tribromoneopentyl alcohol.

<Production of Polyurethane Foam>

The water blocking material of the present invention is a water blocking material formed of a polyurethane foam prepared by reacting and foaming the starting material composition.

By reacting and foaming the constituent components (starting materials) of the starting material composition according to an ordinary method, a polyurethane foam is produced. In producing a polyurethane foam, employable is any of a one-shot method of directly reacting a polyol, a polyisocyanate and other components, or a prepolymer method of previously reacting a polyol and a polyisocyanate to give a prepolymer having an isocyanate group at the terminal thereof followed by further reacting it with a polyol and other components. In addition, also employable is any of a slab foaming method of reacting and foaming the starting materials at room temperature and under an atmospheric pressure, or an in-mold foaming method of injecting a starting material composition (reaction mixture) for a polyurethane foam into a mold, then clamping the mold and reacting and foaming the composition inside the mold.

In the present invention, among these, a slab foaming method is preferred, in which, for example, a starting material composition that has been mixed and stirred according to a one-shot method is jetted out onto a belt conveyer and, while the belt conveyor is moved, the starting material composition thereon is spontaneously foamed and cured at room temperature and under an atmospheric pressure.

Reaction of starting materials for a polyurethane foam is complicated, and mainly includes urethanation reaction through addition polymerization of a polyol and a polyisocyanate, as combined with crosslinking reaction of the reaction product and a polyisocyanate, and foaming reaction of the polyisocyanate and water serving as a foaming agent.

<Polyurethane Foam>

The polyurethane foam as a water blocking material of the present invention preferably has a density (apparent density), as measured according to JIS K 6400-1:2004, of 25 to 50 kg/m$^3$. When the density is 25 kg/m$^3$ or more, the polyurethane foam is excellent in mechanical strength. On the other hand, when the density is 50 kg/m$^3$ or less, the polyurethane foam is light and is favorable for use in vehicles.

The density of the polyurethane foam is preferably 28 to 45 kg/m$^3$, more preferably 30 to 40 kg/m$^3$.

The air permeability of the polyurethane foam, as measured with a foam thickness of 10 mm using a Frazier tester according to JIS K 6400-7:2012, is preferably 5.0 cc/cm$^2$/sec or less, more preferably 1.0 cc/cm$^2$/sec or less. When the air permeability falls within the above-mentioned range, water blocking performance improves.

Further, the number of cells, as measured according to JIS K 6400-1:2004, is preferably 50 cells/25 mm or more. When the number of cells falls within the range, water blocking performance improves owing to the fineness of the cells.

The number of cells is more preferably 60 cells/25 mm or more, even more preferably 70 cells/25 mm or more.

Having such a poorly air-permeable and fine cellular structure, the polyurethane foam can have excellent sealing performance.

<Use>

The water blocking material of the present invention is useful as a water blocking material in a broad field of automobiles, housings, constructions, civil engineering, etc. In particular, as excellent in heat resistance, it is useful as a water blocking material around engines for use in automobiles (vehicles).

EXAMPLES

Next, the present invention is described in more detail with reference to Examples thereof, but the present invention is not whatsoever restricted by these Examples. In the following Examples and Comparative Examples, part and % are part by mass and % by mass, respectively, unless otherwise specifically indicated.

Components used in Examples and Comparative Examples are as mentioned below.
Polyol-1: Dimer acid polyester polyol ("Teslac 2458", available from Hitachi Chemical Co., Ltd., hydroxyl value=75 mgKOH/g, number-average molecular weight=2,500)
Polyol-2: Polyether polyol (PPG-type polyether polyol), "Sannix GP-4000V" (available from Sanyo Chemical, Ltd.), number-average molecular weight: 4,000 TDI: Tolylene diisocyanate (2,4-tolylene diisocyanate/2,6-tolylene diisocyanate=80/20, "Cosmonate T-80", available from Mitsui Chemicals, Inc.) MDI: Cosmonate M-200 (polymeric MDI (polymethylene polyphenyl polyisocyanate), available from Mitsui Chemicals, Inc.)
Amine catalyst-1: TOYOCAT ET33B (bis(2-dimethylaminoethyl) ether (tertiary amine)/dipropylene glycol=33/67% by mass solution, available from Tosoh Corporation)
Amine catalyst-2: TEDA L33 (triethylenediamine/dipropylene glycol=33/67% by mass solution, available from Tosoh Corporation)
Crosslinking agent: Actocol T880 (trifunctional crosslinking agent having trimethylolpropane skeleton, hydroxyl value: 875 mgKOH/g, available from Toyo Chemicals Corporation)
Organic tin catalyst: Nikka Octhix Tin (tin octylate, available from Nihon Kagaku Sangyo Co., Ltd.)
Foam stabilizer-1: CF1218 (reactive silicone (carboxy-modified organosilicone), available from DuPont Toray Specialty Materials K.K.)
Foam stabilizer-2: NIAX SILICONE L-580 (nonreactive silicone, available from Momentive Performance Materials Japan Ltd.)

Example 1

Polyurethane foam starting materials shown in the following Table were mixed and foamed in a one-shot method to give a polyurethane foam. The resultant polyurethane foam was evaluated in the manner mentioned below, and the results are shown in the following Table.

Examples 2 to 9 and Comparative Examples 1 to 6

Water blocking materials of Examples 2 to 9 and Comparative Examples 1 to 6 were produced in the same manner as in Example 1, except that the starting material compositions were changed as in the following Table 1.

The resultant polyurethane foams were evaluated in the manner mentioned below.
(Density (Apparent Density))
Measured according to JIS K 6400-1:2004.
(Air Permeability)
Measured with a foam thickness of 10 mm using a Frazier tester according to JIS K 6400-7:2012.
(Number of Cells)
Measured according to JIS K 6400-1:2004.
(Water Blocking Performance)
As shown in FIG. 1, a 20-mm thick foam sample 1 that had been blanked to have a U-shaped form was sandwiched between two iron plates 3 via spacers 2 therebetween in a 40% compressed state. This was kept endured as such at room temperature (at 25° C.) for 100 hours (ordinary state), or at 132° C. for 100 hours, and then water 4 was put into the U-shaped sample to a predetermined height H (70 mmaq), and the time of water leakage owing to water pressure was measured to evaluate the water blocking performance of the sample. The evaluation standards are as mentioned below. A and B are good, and C and B are not good.
A: After 24 hours, no water leaked and no water penetrated into the water blocking material (sealing material).
B: After 24 hours, no water leaked but some water penetrated into the water blocking material (sealing material).
C: After 24 hours, a little water leaked out.
D: After 24 hours, water leaked out and lost completely.
(Tear Strength)
Measured according to the tear test method B of JIS K 6400-5:2004. When the tear strength is less than 2.0 N/cm, the water blocking material is readily torn and is not good.

TABLE 1

| | | Example | | | | | | | |
|---|---|---|---|---|---|---|---|---|---|
| | | 1 | 2 | 3 | 4 | 5 | 6 | 7 | 8 |
| Composition | Polyol-1 | 100.000 | 100.000 | 100.000 | 85.000 | 100.000 | 100.000 | 100.000 | 100.000 |
| | Polyol-2 | — | — | — | 15.000 | — | — | — | — |
| | TDI | 17.464 | 14.904 | 9.396 | 17.142 | 16.007 | 19.262 | 17.464 | 17.464 |
| | MDI | 40.750 | 44.713 | 53.243 | 39.998 | 37.349 | 44.944 | 40.750 | 40.750 |
| | TDI/MDI ratio | 30/70 | 25/75 | 15/85 | 30/70 | 30/70 | 30/70 | 30/70 | 30/70 |
| | water | 2.800 | 2.800 | 2.800 | 2.800 | 2.400 | 3.200 | 2.800 | 2.800 |
| | Amine catalyst-1 | 0.700 | 0.700 | 0.700 | 0.700 | 0.700 | 0.700 | 0.700 | 0.700 |
| | Amine catalyst-2 | 0.175 | 0.175 | 0.175 | 0.175 | 0.175 | 0.175 | 0.175 | 0.175 |
| | Crosslinking agent | 2.100 | 2.100 | 2.100 | 2.100 | 2.100 | 2.100 | 2.100 | 2.100 |
| | Organic tin catalyst | — | — | — | — | — | — | 0.200 | — |
| | Foam stabilizer-1 | 4.000 | 4.000 | 4.000 | 4.000 | 4.000 | 4.000 | 4.000 | 3.000 |
| | Foam stabilizer-2 | — | — | — | — | — | — | — | — |
| | Isocyanate index | 102 | 102 | 102 | 102 | 102 | 102 | 102 | 102 |
| Evaluation | Density (kg/m$^3$) | 35.0 | 35.0 | 36.2 | 35.0 | 40.0 | 30.0 | 37.5 | 35.5 |
| | Air permeability (cc/cm$^2$/sec) | 0.010 | 0.010 | 0.015 | 0.005 | 0.010 | 0.080 | 0.005 | 0.060 |
| | Number of cells (cells/25 mm) | 70 or more | 70 or more | 70 or more | 70 or more | 70 or more | 60 or more | 70 or more | 60 or more |
| | Water blocking performance in ordinary state, 70 mmaq, 40% compression, 24 hrs | A | A | A | A | A | A | A* | A |

TABLE 1-continued

|  |  |  |  |  |  |  |  |  |
|---|---|---|---|---|---|---|---|---|
| Water blocking performance after 100 hours at 132° C., 70 mmaq, 40% compression, 24 hrs | A | A | A | B | A | B | A* | B |
| Tear strength (N/cm) | 2.7 | 2.5 | 2.5 | 2.2 | 3.0 | 2.5 | 2.8* | 2.3 |

|  |  | Example | Comparative Example | | | | | |
|---|---|---|---|---|---|---|---|---|
|  |  | 9 | 1 | 2 | 3 | 4 | 5 | 6 |
| Composition | Polyol-1 | 100.000 | 100.000 | 70.000 | 50.000 | 100.000 | 100.000 | 100.000 |
|  | Polyol-2 | — | — | 30.000 | 50.000 | | — | — |
|  | TDI | 17.464 | 19.906 | 16.820 | 16.390 | 6.427 | 17.464 | 16.275 |
|  | MDI | 40.750 | 36.969 | 39.250 | 38.243 | 57.840 | 40.750 | 37.975 |
|  | TDI/MDI ratio | 30/70 | 35/65 | 30/70 | 30/70 | 10/90 | 30/70 | 30/70 |
|  | water | 2.800 | 2.800 | 2.800 | 2.800 | 2.800 | 2.800 | 2.800 |
|  | Amine catalyst-1 | 0.700 | 0.700 | 0.700 | 0.700 | 0.700 | 0.700 | 0.700 |
|  | Amine catalyst-2 | 0.175 | 0.175 | 0.175 | 0.175 | 0.175 | 0.175 | 0.175 |
|  | Crosslinking agent | 2.100 | 2.100 | 2.100 | 2.100 | 2.100 | 2.100 | — |
|  | Organic tin catalyst | — | — | — | — | — | — | 0.100 |
|  | Foam stabilizer-1 | 6.000 | 4.000 | 4.000 | 4.000 | 4.000 | — | 4.000 |
|  | Foam stabilizer-2 | — | — | — | — | — | 4.000 | — |
|  | Isocyanate index | 102 | 102 | 102 | 102 | 102 | 102 | 102 |
| Evaluation | Density (kg/m$^3$) | 35.9 | 30.0 | 35.0 | 35.0 | 36.5 | 34.9 | 46.7 |
|  | Air permeability (cc/cm$^2$/sec) | 0.041 | 0.100 | 0.210 | 0.385 | 0.005 | 0.021 | Unmeasurable |
|  | Number of cells (cells/25 mm) | 70 or more | 60 or more | 60 or more | 60 or more | 70 or more | 60 or more | cells roughened |
|  | Water blocking performance in ordinary state, 70 mmaq, 40% compression, 24 hrs | A | A | A | C | A | D | D |
|  | Water blocking performance after 100 hours at 132° C., 70 mmaq, 40% compression, 24 hrs | A | C | D | D | A | D | D |
|  | Tear strength (N/cm) | 2.6 | 2.7 | 1.9 | 1.6 | 1.8 | 2.2 | 3.0 |

*In Example 7, the product shrank after having foamed, and a urethane foam was often difficult to form.

As obvious from Table 1, the water blocking materials of Examples 1 to 9 still kept high water blocking performance even after the heating test. In addition, all these water blocking materials had a high tear strength and were excellent in flexibility. On the other hand, in Comparative Example 3 where the content of the dimer acid polyol was 50% by mass of the entire polyol, the foam could not have sufficient water blocking performance even in an ordinary state. In Comparative Example 2 where the content of the dimer acid polyol was 70% by mass of the entire polyol, the foam had sufficient water blocking performance in an ordinary state but was poor in heat resistance, and therefore after the heating test, the water blocking performance of the foam was not good.

In Comparative Example 1 where the content of the diphenylmethane diisocyanate compound was less than 70% by mass of the entire polyisocyanate, the foam had sufficient water blocking performance in an ordinary state but was poor in heat resistance, and therefore after the heating test, the water blocking performance of the foam was not good. In Comparative Example 4 where the content of the diphenylmethane diisocyanate was more than 85% by mass of the entire polyisocyanate, the water blocking material was had a low tear strength and was poor in flexibility.

In Comparative Example 5 where not a reactive silicone but a nonreactive silicone was used as a foam stabilizer, the foam could not have sufficient water blocking performance even in an ordinary state. In Comparative Example 6 not containing a crosslinking agent, a fine cellular structure was difficult to form, and the resultant foam had large and small cells as mixed in a roughened state and therefore had extremely poor water blocking performance.

INDUSTRIAL APPLICABILITY

The water blocking material of the present invention is excellent in heat resistance and water blocking performance and also excellent in flexibility, and is therefore especially favorably used for uses that are required to have heat resistance and high tear resistance, such as water blocking materials around engines for vehicles.

REFERENCE SIGNS LIST

1: U-shape blanked, 20-mm thick foam sample
2: Spacer
3: Iron plate
4: Water

The invention claimed is:

1. A water blocking material prepared by reacting and foaming a starting material composition that contains a polyol, a polyisocyanate, a catalyst, a foaming agent, a foam stabilizer and a crosslinking agent, wherein:
the polyol contains a dimer acid polyol,
the content of the dimer acid polyol in the starting material composition is 85% by mass or more of the entire polyol, the polyisocyanate contains a diphenylmethane diisocyanate, the content of the diphenylmethane diisocyanate in the starting material composition is 70 to 75% by mass of the entire polyisocyanate, the foam stabilizer contains a reactive silicone, and the crosslinking agent is a trifunctional crosslinking agent having a trimethylolpropane skeleton.

2. The water blocking material according to claim 1, wherein the foaming agent contains water, and the content of water in the starting material composition is 2.4 to 3.2 parts by mass relative to 100 parts by mass of the polyol.

3. The water blocking material according to claim 1, wherein the polyisocyanate further contains a tolylene diisocyanate.

4. The water blocking material according to claim 1, wherein the catalyst does not contain an organic metal catalyst or the content of an organic metal catalyst in the starting material composition is less than 0.2 parts by mass relative to 100 parts by mass of the polyol.

5. The water blocking material according to claim 1, wherein the content of the crosslinking agent in the starting material composition is 1.5 to 3 parts by mass relative to 100 parts by mass of the polyol.

6. The water blocking material according to claim 1, wherein the content of the foam stabilizer in the starting material composition is 3.0 to 6.0 parts by mass relative to 100 parts by mass of the polyol.

7. The water blocking material according to claim 1, having a density of 30 to 50 kg/m$^3$.

8. The water blocking material according to claim 1, wherein the number of cells that the water blocking material has is 60 cells/25 mm or more.

9. The water blocking material according to claim 2, wherein the polyisocyanate further contains a tolylene diisocyanate.

10. The water blocking material according to claim 2, wherein the catalyst does not contain an organic metal catalyst or the content of an organic metal catalyst in the starting material composition is less than 0.2 parts by mass relative to 100 parts by mass of the polyol.

11. The water blocking material according to claim 2, wherein the content of the crosslinking agent in the starting material composition is 1.5 to 3 parts by mass relative to 100 parts by mass of the polyol.

12. The water blocking material according to claim 2, wherein the content of the foam stabilizer in the starting material composition is 3.0 to 6.0 parts by mass relative to 100 parts by mass of the polyol.

13. The water blocking material according to claim 2, having a density of 30 to 50 kg/m$^3$.

14. The water blocking material according to claim 2, wherein the number of cells that the water blocking material has is 60 cells/25 mm or more.

15. The water blocking material according to claim 3, wherein the catalyst does not contain an organic metal catalyst or the content of an organic metal catalyst in the starting material composition is less than 0.2 parts by mass relative to 100 parts by mass of the polyol.

16. The water blocking material according to claim 3, wherein the content of the crosslinking agent in the starting material composition is 1.5 to 3 parts by mass relative to 100 parts by mass of the polyol.

17. The water blocking material according to claim 3, wherein the content of the foam stabilizer in the starting material composition is 3.0 to 6.0 parts by mass relative to 100 parts by mass of the polyol.

18. The water blocking material according to claim 1, wherein the catalyst does not contain an organic metal catalyst.

19. The water blocking material according to claim 1, wherein the water content is 2.0 to 3.2 parts by mass relative to 100 parts by mass of the polyol.

20. The water blocking material according to claim 1, wherein the catalyst contains a reactive amine catalyst and a nonreactive amine catalyst.

\* \* \* \* \*